US012069718B2

(12) United States Patent
Christoffersson et al.

(10) Patent No.: US 12,069,718 B2
(45) Date of Patent: Aug. 20, 2024

(54) NETWORK NODE, A COMMUNICATIONS DEVICE AND METHODS THEREIN FOR TRANSMISSION OF UPLINK GRANTS

(71) Applicant: Telefonaktiebolaget LM Ericsson (publ), Stockholm (SE)

(72) Inventors: Jan Christoffersson, Luleå (SE); Min Wang, Luleå (SE); Mats Folke, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 16 days.

(21) Appl. No.: 16/973,817

(22) PCT Filed: Jun. 13, 2018

(86) PCT No.: PCT/SE2018/050615
§ 371 (c)(1),
(2) Date: Dec. 10, 2020

(87) PCT Pub. No.: WO2019/240636
PCT Pub. Date: Dec. 19, 2019

(65) Prior Publication Data
US 2021/0195631 A1 Jun. 24, 2021

(51) Int. Cl.
*H04W 74/00* (2009.01)
*H04W 74/0833* (2024.01)

(52) U.S. Cl.
CPC ....... *H04W 74/004* (2013.01); *H04W 74/006* (2013.01); *H04W 74/0833* (2013.01)

(58) Field of Classification Search
CPC ............. H04W 74/004; H04W 74/006; H04W 74/0833; H04W 72/14; H04W 72/23
See application file for complete search history.

(56) References Cited

U.S. PATENT DOCUMENTS 9,144,079 B1 9/2015 Marupaduga et al.
2004/0132441 A1* 7/2004 Livet ................. H04W 16/04
455/422.1

(Continued)

FOREIGN PATENT DOCUMENTS

WO 2017192171 A1 11/2017

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.1.0, Mar. 2018, 1-109.

(Continued)

*Primary Examiner* — Thinh D Tran
(74) *Attorney, Agent, or Firm* — Sage Patent Group

(57) ABSTRACT

A network node (206) and a method for transmitting uplink grants to a communications device (208), wherein the communications device operates in a service area (206a) served by the network node. The network node determines, based on a load measure on a Physical Random Access Channel, PRACH, between the network node and the communications device in relation to a load threshold, a number of uplink grants that are to be associated with a Random Access Preamble Identity, RAPID, of a PRACH preamble transmission received from the communications device. Further, the network node indicates the determined number to the communications device; and transmits the determined number of uplink grants to the communications device.

14 Claims, 10 Drawing Sheets

Method performed by network node 206

(56) References Cited

U.S. PATENT DOCUMENTS

| | | | |
|---|---|---|---|
| 2008/0268893 A1* | 10/2008 | Lee | H04W 52/362 |
| | | | 455/522 |
| 2009/0163199 A1* | 6/2009 | Kazmi | H04L 1/0027 |
| | | | 455/425 |
| 2011/0098035 A1* | 4/2011 | Frenger | H04W 74/006 |
| | | | 455/423 |
| 2016/0242213 A1* | 8/2016 | Dabeer | H04W 74/0833 |
| 2016/0345355 A1* | 11/2016 | Andersson | H04W 72/1268 |
| 2017/0374686 A1* | 12/2017 | Agarwal | H04W 72/14 |
| 2019/0124546 A1* | 4/2019 | Phuyal | H04W 72/21 |
| 2019/0230718 A1* | 7/2019 | Miao | H04W 8/22 |

OTHER PUBLICATIONS

Qualcomm Incorporated, "An enhancement for mitigating contention in random access", 3GPP TSG-RAN WG2 Meeting RAN2 #99bis, R2-1711707, Resubmission of R2-1709120, Prague, Czech, Oct. 9-13, 2017, 1 page.

Extended European Search Report for European Application No. 18922473.6 dated May 26, 2021, 8 pages.

* cited by examiner

Figure 3 Method performed by network node 206

Figure 5 Method performed by communications device 208,210

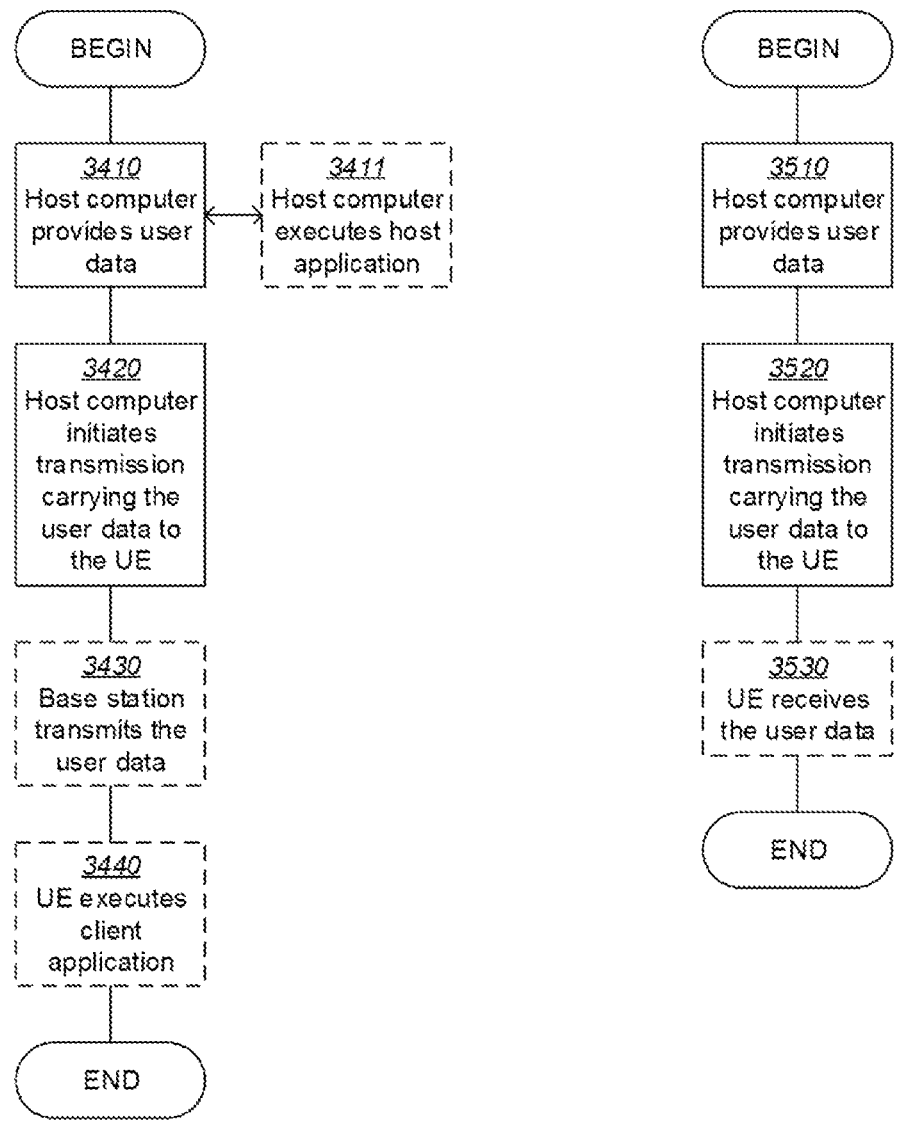

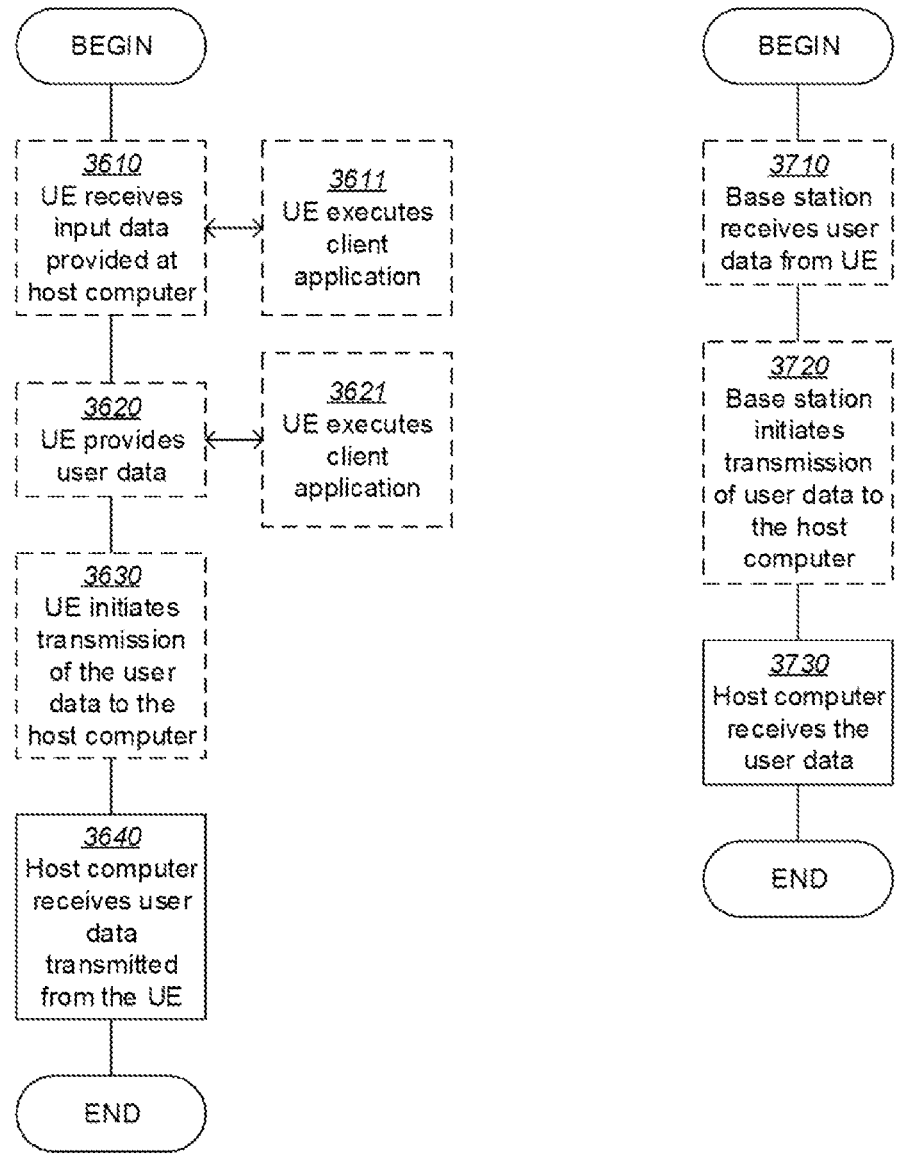

NETWORK NODE, A COMMUNICATIONS DEVICE AND METHODS THEREIN FOR TRANSMISSION OF UPLINK GRANTS

TECHNICAL FIELD

Embodiments herein relate to a network node, a communications device, and to methods therein. Especially, embodiments herein relate to transmission of uplink grants from the network node.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. an "eNB", an "eNodeB", a "NodeB", a B node", or a Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In the 3GPP LTE, base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

Random Access in LTE

In modern cellular radio systems, e.g. wireless communications systems or networks, the radio network, e.g. by means of a radio network node, has a strict control on the behavior of a terminal also referred to as a UE. Uplink transmission parameters like frequency, timing, and power are regulated via downlink control signaling from a network node, such as a base station also referred to as an eNodeB, to the UE. For instance, by time-aligning the Uplink (UL) transmissions, orthogonality between UEs may be achieved in the time domain, and this is necessary since the radio resources are scarce.

At power-on or after a long standby time, the UE is not synchronized in the UL. The UE may derive an UL frequency and power estimate from downlink (DL) control signals from the eNodeB. However, a timing estimate is difficult to make since the round-trip propagation delay between the eNodeB and the UE is unknown. So even if the UE UL timing is synchronized to the DL, it may arrive too late at the eNodeB receiver because of propagation delays. Therefore, before commencing transmitting traffic, the UE has to carry out a Random Access (RA) procedure to the radio network, e.g. the radio network node. After RA, the eNodeB can estimate the timing misalignment of the UE UL and send a correction message.

Usually, a Physical Random Access Channel (PRACH) is provided for the UE to request access to the network. A RA preamble is used which is based on a specific sequence with good auto-correlation. Because multiple UEs may request access at the same time, collisions may occur between requesting UEs. Therefore, a contention resolution scheme has to be implemented to separate the UE transmissions. A contention resolution when used herein is a method used to avoid resource contention by attempting to avoid simultaneous attempts to access the same resource, e.g. the PRACH. To distinguish between different UEs performing RA, typically many different preambles exist. A UE performing RA randomly picks a preamble out of a pool of preambles and transmits it. The preamble represents a random UE identity (ID) which may be used by the eNodeB when granting the UE access to the network. The eNodeB receiver may resolve RA attempts performed with different preambles and send a response message to each UE using the corresponding random UE IDs. In case multiple UEs simultaneously use the same preamble a collision occurs and most likely the RA attempts are not successful since the eNodeB cannot distinguish between the two users, e.g. UEs, with the same random UE ID.

To minimize the probability of collision, the set of available sequences should be large.

FIG. 1 schematically illustrates an example of a Random Access procedure in LTE as specified in the 3GPP documents 36.321 sections 5.1 and 6.

Action 101. The UE transmits a RA preamble to the eNodeB (eNB). The eNodeB receiver listens at all RA opportunities to detect preambles. In case a preamble is successfully detected, a RA Response (RAR) that comprises, e.g., the detected preamble(s) i.e. Random Access Preamble Identifier(s) (RAPID(s)), timing advance information and an UL grant for an UL transmission (e.g., Msg3 in step 3 of the RA procedure), is sent in a special message on the DL from the eNodeB to the UE. This is illustrated in Action 102. The UL grant comprised in a RA response is henceforth sometimes referred to as RA response grant or just referred to as a grant. The UL grant comprises information about one or more resources available for the UE for the UL transmission.

A UE that has recently performed a RA preamble transmission is listening within a certain time window after the preamble has been sent to receive a RA response. In case of a successful reception of the RA response, the UE continues with Actions 103 and 104 of the RA procedure. In case no RA response is received by the UE within the specified time window, a new attempt is made, e.g. a new RA preamble is transmitted to the eNodeB, cf. Action 101.

Action 103. After receiving the RA Response in Action 102, the UE decodes the message and reads the enclosed RA Response grant. The UE then sends the RA message 3 (msg3) using this grant, i.e. the enclosed RA Response grant also referred to as the UL grant. In LTE, the timing of the grant is given by the standard and a flag inside the grant.

Action 104. In response to a received RA msg3, the eNodeB transmits an RA message 4 (msg4) to the UE providing RA contention resolution. The message 4 may comprise information about the uplink grant and of downlink assignments.

Action 105. Further transmissions may be transmitted between the UE and the eNodeB, e.g. uplink transmissions from the UE to the eNodeB and/or downlink transmissions from the eNodeB to the UE.

SUMMARY

An object addressed by embodiments herein is how to improve performance in a wireless communications network.

According to an aspect of embodiments herein, the object is achieved by a method performed by a network node for transmitting uplink grants to a communications device. The communications device operates in a service area served by the network node.

Based on a load measure on a Physical Random Access Channel (PRACH) between the network node and the communications device in relation to a load threshold, the network node determines a number of uplink grants that are to be associated with a Random Access Preamble Identity (RAPID) of a PRACH preamble transmission received from the communications device.

The network node indicates the determined number to the communications device, and transmits the determined number of uplink grants to the communications device.

According to another aspect of embodiments herein, the object is achieved by a network node for transmitting uplink grants to a communications device. The communications device is configured to operate in a service area served by the network node.

The network node is configured to determine, based on a load measure on a Physical Random Access Channel (PRACH) between the network node and the communications device in relation to a load threshold, a number of uplink grants that are to be associated with a Random Access Preamble Identity (RAPID) of a PRACH preamble transmission received from the communications device.

The network node is configured to indicate the determined number to the communications device, and to transmit the determined number of uplink grants to the communications device.

According to another aspect of embodiments herein, the object is achieved by a method performed by a communications device for assisting a network node in transmitting uplink grants to a communications device. The communications device operates in a service area served by the network node.

The communications device determines a load measure on a Physical Random Access Channel (PRACH) between the network node and the communications device, and transmits the determined load measure to the network node.

According to another aspect of embodiments herein, the object is achieved by a communications device for assisting a network node in transmitting uplink grants to a communications device. The communications device is configured to operate in a service area served by the network node.

The communications device is configured to determine a load measure on a Physical Random Access Channel (PRACH) between the network node and the communications device, and to transmit the determined load measure to the network node.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a computer program, comprising instructions which, when executed on at least one processor, causes the at least one processor to carry out the method performed by the communications device.

According to another aspect of embodiments herein, the object is achieved by a carrier comprising the computer program, wherein the carrier is one of an electronic signal, an optical signal, a radio signal or a computer readable storage medium.

An advantage with some embodiments disclosed herein is that they make it possible to adapt the transmission of uplink grants depending on traffic load and service mix in the service area whereby a good balance between a potential latency reduction for the user data transmission and an increased overhead in the radio communication in the communications network is achieved. This may also be expressed as embodiments disclosed herein make it possible to tune the configuration of uplink grants depending on the traffic load and the service mix provided.

By the term "traffic load" or just "load" when used in this disclosure is meant the load on a communications channel in a wireless communications network due to communications over the communications channel between communications devices and network nodes operating in the wireless communications network.

By the term "overhead" when used herein is meant overhead information generated within the communications network and not delivered to the communications device. This overhead is sometimes referred to as system overhead information. A larger overhead will reduce the throughput in the communications network.

BRIEF DESCRIPTION OF DRAWINGS

Examples of embodiments herein will be described in more detail with reference to attached drawings in which:

FIGS. 9 to 12 are flowcharts illustrating methods implemented in a communication system including a host computer, a base station and a user equipment.

DETAILED DESCRIPTION

Figure 1:
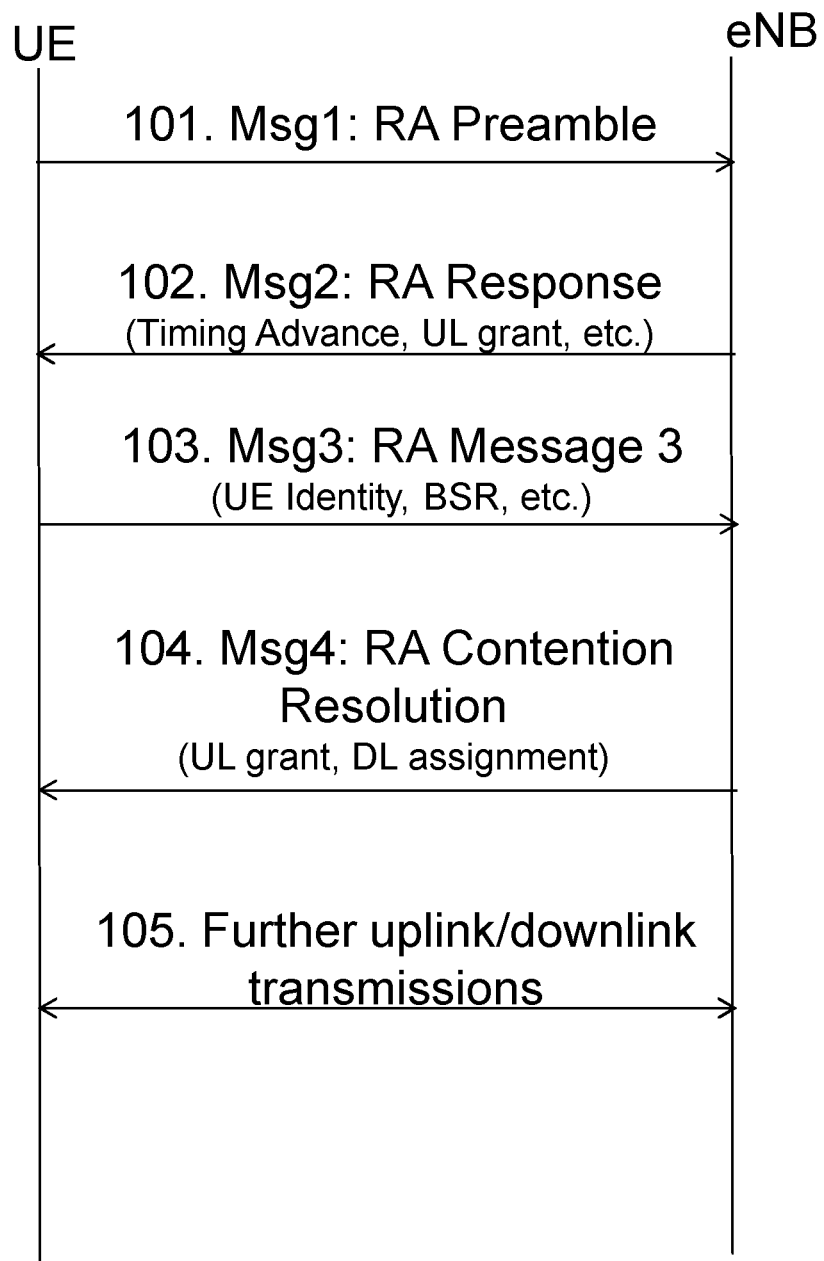
FIG. 1 schematically illustrates an example of a Random Access procedure in LTE according to prior art.

As part of developing embodiments herein, some drawbacks with the state of the art communications networks will first be identified and discussed.

For New Radio (NR) communications networks, there are proposals to allow the RAR to contain more than one grant to a specific preamble. This may be beneficial if two or more communications devices, e.g. UEs, select the same preamble and PRACH resource. When the network node, e.g. a gNB, responds with the RAR with one grant to this preamble, all communications devices will transmit their own (different) msg3s which will then collide. In this case, the network node will only detect one of these msg3 and the other network nodes(s) will then have to retry the random access by retransmitting the preamble. Preamble collisions may be more common if small preamble groups are used to signal e.g. msg3 size with high granularity.

If the network node sends several grants associated with the same preamble, it has been proposed that the communications device should randomly select a grant to use for transmission of the msg3. The benefit of this procedure would be that the risk of msg3 collision would be reduced. If more than two grants are issued to a preamble, the collision probability would be reduced even further. The procedure of issuing more than one grant for msg3 transmission may be feasible in situations when the PUSCH resources are not exhausted.

The solution of sending more than one grant in a RAR per RAPID has been suggested as a method to decrease the preamble collision probability and to allow communications devices to transmit small data with the message msg3. However, always supplying more than one uplink grant will lead to increased DL overhead when the UL RACH load is low and the probability of preamble collision is low. In this case it is more advantageous to only include one grant per RAPID, since this will reduce the RAR size by 20 bits per included RAPID. These 20 bits corresponds to the size of the grant in the RAR sub-header. Including more UL grants when not needed also waists UL resources in case these are unused. The size of the UL resources is in the order of 56 bits per grant, which is the smallest grant the gNB will issue.

In summary, the situation in a cell suiting different RAR formats, i.e., carrying single or multiple grants associated with the same RAPID, may change from time to time. The existing RACH procedure in the Medium Access Control (MAC) specification does not allow such adaptation of RAR format. If such adaptation was available, the number of grants for the same RAPID carried by a RAR could be dynamically changed. Furthermore, upon update of the RAR format, the communications device should be signaled to adjust its actions according to the number of uplink grants that are sent in the RAR.

An aim of some embodiments disclosed herein is to overcome or mitigate at least some of the drawbacks with the prior art.

Embodiments herein relates to the adaptation of a RAR format based on determined PRACH load. When a low PRACH load is determined, the communications network, e.g. a network node, uses a RAR format which includes a single UL grant associated with each detected PRACH preamble, since there is a low probability of RA message 3 collision when there is a low PRACH load. When a high PRACH load is determined, the communications network, e.g. a network node, uses the RAR format which includes multiple UL grants associated with each detected PRACH preamble. The exact number of grants per RAPID may be different depending on different RACH load threshold levels. Different RACH load threshold levels may be preconfigured in each service area.

The exact RAR format, i.e., the number of grants per RAPID must be signalled to the communications device, so the communications device may take the right actions. The signalling may be carried out via system information, or dedicated RRC signalling or other signalling means such MAC CE, or Layer 1 (L1)/Layer 2 (L2) control signalling such as Downlink Control Information (DCI).

The determination of the RACH load and the corresponding selection of the RAR format may be performed per Random Access preamble group and/or per PRACH resource group. The Random Access preamble/PRACH resources are split into groups serving different purposes, such as different Synchronization Signal Block (SSB), different SSB groups, different beam set, or different sizes of data volume to be carried in the RA message 3 etc. In this way, there may be several RAR formats with respect to the number of grants per RAPID applied at the same time in the same service area, e.g. in the same cell. Each format may be applied for a specific Random Access preamble or specific PRACH resource group.

Additionally, there are several metrics that may be applied such as RACH load or traffic mix where a high fraction of devices sending data with the RA message 3, would result in two grants per PRACH preamble.

Note that although terminology from LTE is used in this disclosure to exemplify the embodiments herein, this should not be seen as limiting the scope of the embodiments herein to only the aforementioned system. Other wireless systems, such as for example a NR network, a 5G network, an LTE network, a Wideband Code Division Multiple Access (WCDMA) network, a Global System for Mobile Communications (GSM) network, any 3GPP cellular network, a Worldwide Interoperability for Microwave Access (WiMAX) network, a Wireless Local Area Network (WLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

It should furthermore be noted that, to anyone skilled in the art, there are several realizations of the embodiments below with principally equivalent functionality.

In addition, it should be noted that message names, parameters, information elements and field names may change during the course of the specification work which implies that embodiments described herein still apply as long as the principal function and/or use is the same.

Some exemplifying embodiments will now be described in more detail.

Figure 2:
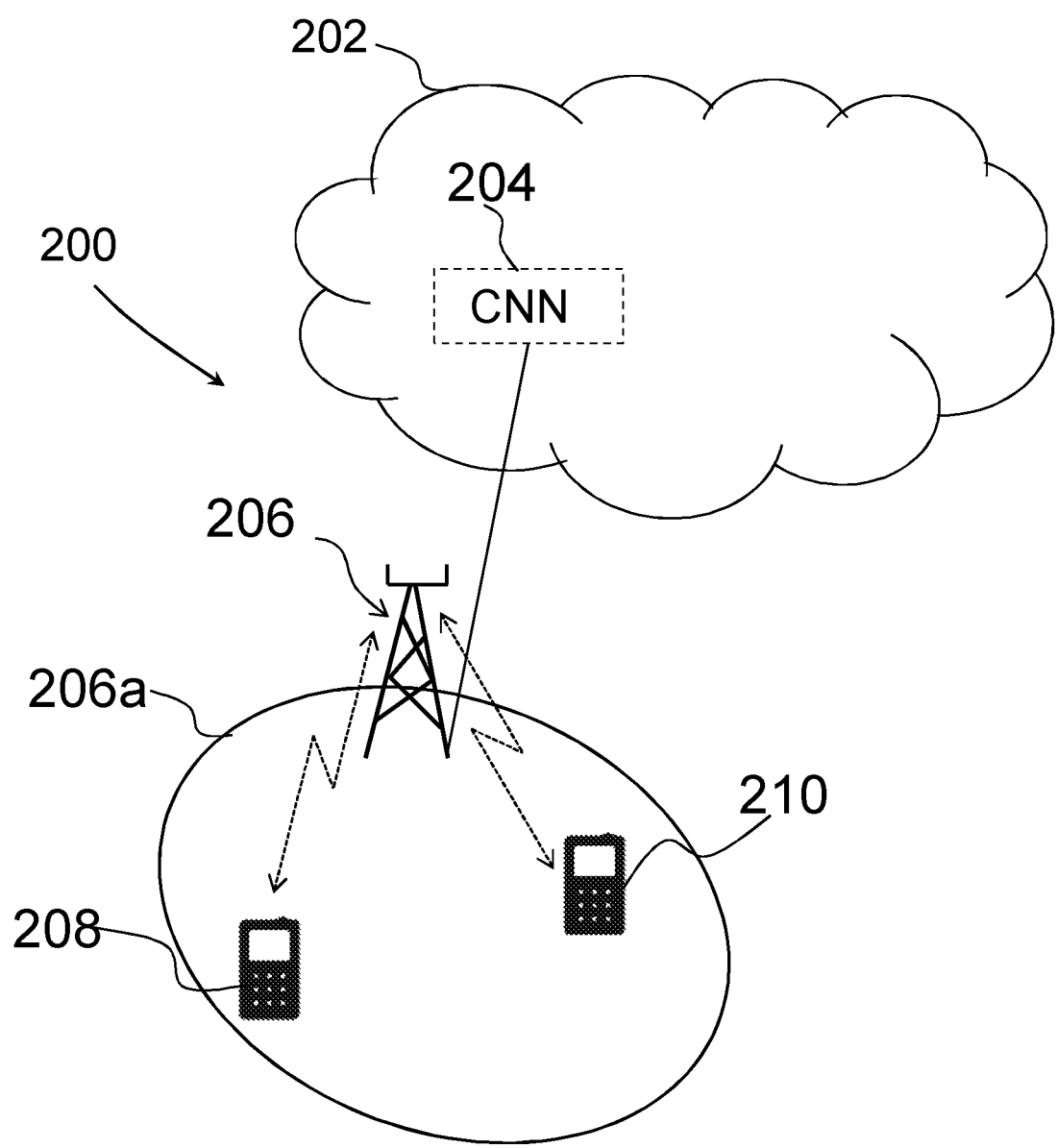
FIG. 2 schematically illustrates embodiments of a wireless communications network.

FIG. 2 depicts an example of the wireless communications network 200 in which embodiments herein may be implemented. The wireless communications network 200 may be a cellular communications network such as a NR network, a 5G network, an LTE network, a WCDMA network, a GSM network, any 3GPP cellular network, or a short range communications network, such as a WLAN, an LR-WPAN, a Bluetooth network, WiMAX network, a SIGFOX network, a Zigbee network, a BLE network such as a Bluetooth Smart network, or a CIoT network such as an EC-GSM-IoT network, a NB-IoT network or an eMTC network, or a combination of one or more of the aforementioned communications networks just to mention some examples.

A Core Network (CN) 202 may be comprised in the communications network 200 The core network 202 may be an NR core network, a 5G core network, an LTE core network, a WCDMA core network, a GSM core network, any 3GPP cellular core network, or a short range communications core network, such as a WLAN core network, an LR-WPAN core network, a Bluetooth core network, WiMAX core network, a SIGFOX core network, a Zigbee core network, a BLE core network such as a Bluetooth Smart network, or a CIoT network such as an EC-GSM-IoT core network, a NB-IoT core network or an eMTC core network, or a combination of one or more of the aforementioned communications core networks just to mention some examples.

A Core Network Node (CNN) 204 may be comprised in or arranged in communication with the core network 202. The core network node 204 may be a Mobility Management Entity (MME) or a Serving GPRS Support Node (SGSN). The core network node is sometimes referred to as just a network node 204.

A Radio Network Node (RNN) 206 is arranged and configured to operate in the communication network 200. The RNN 206 is configured for wireless communication with communications devices, e.g. communications devices such as a communications device 208, when they are located within a service area 206a, such as a coverage area e.g. a geographical area, served by the RNN 206. It should be understood that the RNN 206 may serve or manage a plurality of service areas 206a, even though only one is illustrated in FIG. 2 for clarity reasons. The one more service areas 206a are sometimes in this disclosure referred to as one or more cells 206a.

The RNN 206 may be a transmission point such as a radio base station, for example a gNB, an E-UTRA node, an LTE eNB, an eNB, a Node B, or an Home Node B, an Home eNode B, a BTS or any other network node being capable to serve a communications device in a communications network, such as the communications network 200. The RNN 206 may further be configured to communicate with the core network node 204. The RNN 206 is sometimes in this disclosure referred to as just a network node 206.

A communications device 208 is operating in the wireless communications network 200. In some embodiments, one or more further communications device 210 is operating in the wireless communications network 200. In such embodiments, the communications device 208 may be referred to as a first communications device 208 and the one or more further communications devices 210 may be referred to as one or more second communications devices 210.

The communications device 208, 210, also sometimes referred to as a wireless communications device, a wireless device, a User Equipment (UE), a terminal, or a Mobile Station (MS), may be located in the wireless communications network 200. For example, the communications device 208, 210 may be an Internet of Things (IoT) device, a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. In some embodiments, the communications device 208,210 is a stationary wireless device. Thus, the communications device 208,210 is sometimes in this disclosure referred to as a stationary communications device 208,210. By the expression "stationary wireless device" when used herein is meant that the communications device 208,210 is not moving. For example, the stationary communications device 208,210 is not moving when in use, e.g. during operation.

The communications device 208,210 is sometimes referred to as just a network node 208. Further, the RNN 206, the communications device 208,210, and the core network node 204, may be referred to as first, second and third network nodes 208,210; 206, 204.

Figure 3:
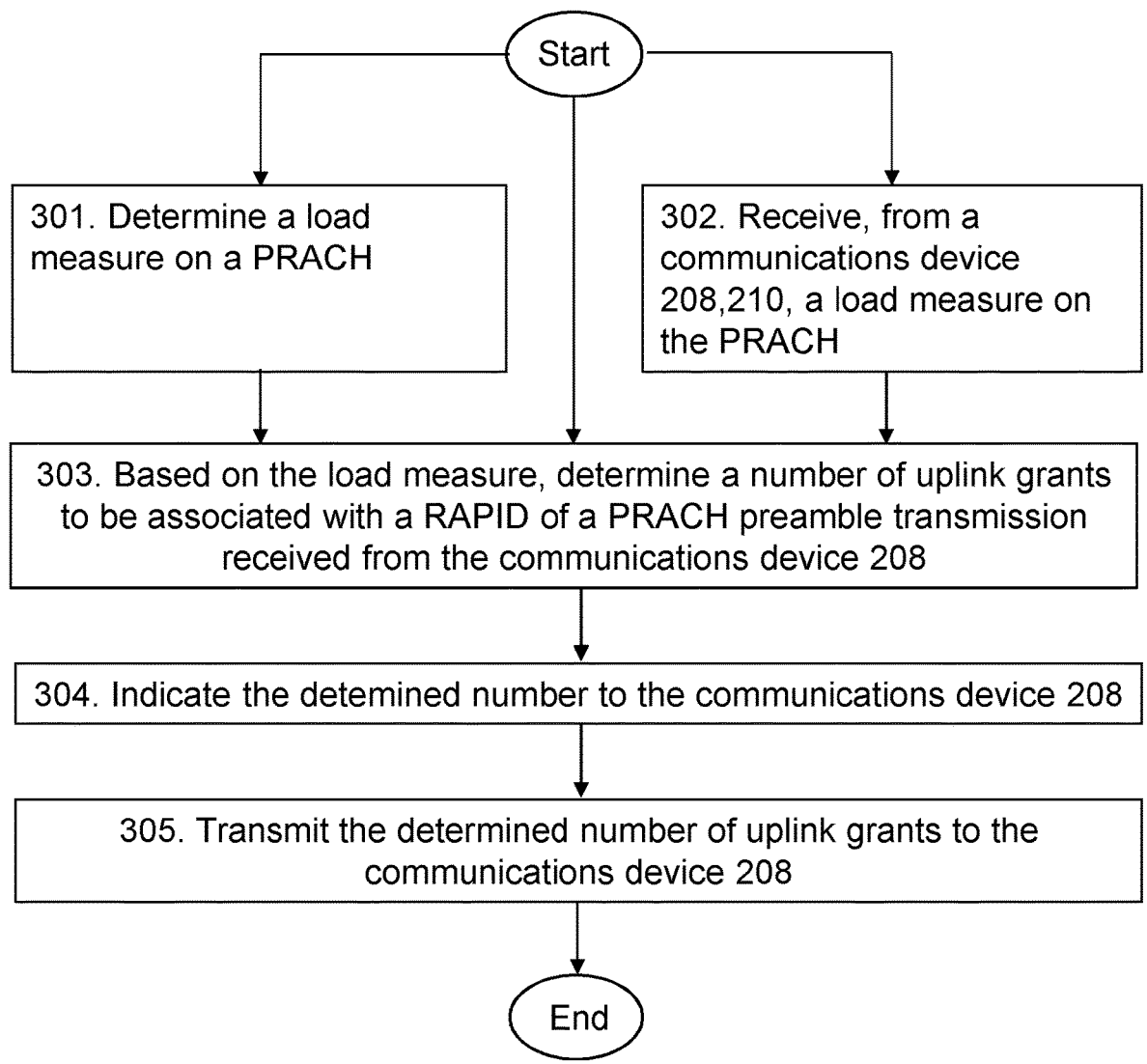
FIG. 3 is a flowchart depicting embodiments of a method performed by a network node.

An example of a method performed by the network node 206 for transmitting uplink grants to the communications device 208 will now be described with reference to a flowchart depicted in FIG. 3. As previously mentioned, the communications device 208 operates in the service area 206a served by the network node 206.

The methods comprise one or more of the following actions. Thus, one or more of the following actions may be optional. Further, it should be understood that the actions may be taken in any suitable order and that some actions may be combined.

Actions 301

In some embodiments, the network node 206 determines a load measure on a Physical Random Access Channel (PRACH) between the network node 206 and the communications device 208.

By the expression "load measure" when used in this description is meant a measure of the load on the PRACH between the network node 206 and the communications device 208. The measure does not have to be an explicit value, but it could be a relative measure such as low, normal, high, etc.

The network node 206 may determine the load measure in different ways which will be described below.

As a first example, the network node 206 may determine a number of available PRACH occasions that are used for PRACH preamble transmissions to the network node 206, and then the network node 206 may determine the load measure based on a number of received PRACH preamble transmissions in relation to the number of available PRACH occasions. An available PRACH occasion is a preconfigured occasion for a transmission using the PRACH. Sometimes, the PRACH occasion is referred to as a RACH occasion and it should be understood that the terms may be used interchangeably. For example, if the number of received PRACH preamble transmissions in relation to the number of available PRACH occasions is high, e.g. more than half of the number, the load measure may be determined to be high.

As a second example, the network node 206 may determine a received power of a PRACH preamble transmission and determine the load measure as a function of the measured received power. For example, if there is a high load in the wireless communications network 200, e.g. in the service area 206a, the network node 206 may order some of the communications devices 208,210 operating in the service area 206a to do back-off meaning that these communications devices 208,210 will retransmit a PRACH preamble after a given time and with a ramped up power, i.e. with a higher power for each retransmission. This means that if there is high load in the service area 206a and many communications devices 208, 210 do back-off, the average power among the communications devices 208, 210 will be higher than if they succeed with the RA at the first PRACH preamble transmission attempt.

As a third example, the network node 206 may determine a number of RAs, determine a service causing the RAs, and e.g. based on the determined service, determine the load measure as a predetermined percentage of the determined number of RAs. It should be understood that each RA may comprise several PRACH preamble transmissions. In other words, several PRACH preamble transmissions may be needed in order to complete the RA procedure. Further, it should be understood that different services may have different Quality of Service (QoS) requirements. For example, a low load must be maintained for latency sensitive services in order to achieve a low latency for the data transmission providing the service. Furthermore, different services may have different load thresholds to determine if a high load is reached. Thereby, different load thresholds for different services may be configured in order to determine if the system, i.e. the PRACH, is highly loaded. For example, what is considered as low/high load may depend on the services (using any of the previous measures). In case of a delay sensitive service, having more than e.g. x % of the PRACH occasions used for preamble transmissions would mean high load, while for some other, less important or delay sensitive services, having more than x+y % of PRACH occasions used for preamble transmissions would mean high load.

As a fourth example, the network node 206 may determine a geographical distribution of communications devices 208,210 operating within the service area 206a and of different types of services, e.g. of a service mix, provided in the service area 206a served by the network node 206 and determine the load measure as a function of the determined geographical distribution of the communications devices 208,210 and of the different types of services. For example, the load measure may be determined to be low when the geographical distribution of the communications devices 208,210 is below a lower threshold, and high when the geographical distribution of the communications devices 208,210 is above an upper threshold. Similarly, the load may be determined to be medium when the geographical distribution of the communications devices 208,210 is between the lower and upper thresholds.

As a fifth example, the network node 206 may determine a number of RAs as a function of a time of day and determining the load measure based on the determined number of RAs and on the time of the day. For example, the load measure may be determined to be low when the number of RAs are below a lower threshold, and high when the number of RAs are above an upper threshold. The lower and upper thresholds may be different during the busy hours or idle hours of the day.

As a sixth example, the network node 206 may measure received uplink radio channel quality for transmissions received on the PRACH, on a Physical Uplink Shared Channel (PUSCH), or on a Physical Uplink Control Channel (PUCCH), and determine the load measure based on the measured received uplink radio channel quality. Thus, the network node 206 may determine the load measure on the PRACH based on measurements performed on the PUSCH or the PUCCH. For example, if the channel quality on the PUSCH or the PUCCH is determined to be poor, there is a high load in the service area 206a and thus it is assumed that the load on the PRACH is high as well. Thus, the load measure on the PRACH may be determined based on measured received uplink radio channel quality on the PUSCH or the PUCCH.

The uplink radio signal quality may be a Signal-to-Interference plus Noise Ratio (SINR) used to give an upper bound on channel capacity or the rate of information transfer or the transmission power of the corresponding RA transmission that is used by the communications devices in the wireless communication network 200.

Action 302

Alternative or additionally, the network node 206 may receive the load measure on the PRACH from the communications device 208 or from another communications device 210 operating in the service area 206*a*. If the network node 206 receives the load measure in addition to determining it as described in Action 301 above, the network node 206 may combine the received load measure with the determined load measure to determine the load.

Actions 303

Based on the load measure on the PRACH between the network node 206 and the communications device 208 in relation to a load threshold, the network node 206 determines a number of uplink grants that are to be associated with a Random Access Preamble Identity (RAPID), of a PRACH preamble transmission received from the communications device 208.

In some embodiments, when the load measure is above the load threshold, the network nodes 206 determines the number of uplink grants per RAPID as two or more uplink grants, and when the load measure is equal to or below the load threshold, the network nodes 206 determines the number of uplink grants per RAPID as one uplink grant. Thus, when the load on the PRACH is determined to be high, the network node 206 determines that two or more uplink grants per RAPID is needed in order to avoid transmission collisions, e.g. to avoid collisions in message 3, Msg3, transmissions from different communications devices 208,210. Further, when the load on the PRACH is determined to be low, the network node 206 determines that one grant per RAPID will sufficient in order to avoid the transmissions collisions.

The network node 206 may determine the number of uplink grants for every PRACH preamble or for a group of PRACH resources. By the term "PRACH resources" when used in this disclosure is meant the resources configured for a PRACH transmission in the time and frequency domain.

Actions 304

The network node 206 indicates the determined number of uplink grants to the communications device 208. Thereby, the communications device 208 will receive information about how many uplink grants the network node 206 will send to the communications device 208 in response to a PRACH preamble transmission being associated with a certain RAPID.

The network node 206 may indicate the determined number of uplink grants in several ways by e.g. transmitting an indication indicating the number of uplink grants.

As a first example, the network node 206 may indicate the number of uplink grants per RAPID in a Radio Resource Control (RRC), message transmitted to the communications device 208. Thus, the network node 206 may indicate the number of uplink grants per RAPID using dedicated RRC signalling. The RRC message may be a RRC connection reconfiguration message or a similar message configured to reconfigure parameters related to actions performed by the communications device 208. Further, the communications device 208 may be in connected inactive mode or in connected active mode.

As a second example, the network node 206 may indicate the number of uplink grants per RAPID in a Medium Access Control (MAC) Control Element (CE) transmitted to the communications device 208. Thus, the network node 206 may indicate the number of uplink grants per RAPID using Layer 1/Layer 2 signalling.

As a third example, the network node 206 may indicate the number of uplink grants per RAPID in a System Information Block (SIB). Thus, the network node 206 may broadcast the indication of the number of uplink grants per RAPID. In this scenario, the configuration may apply to all connected communications devices 208,210 in the service area 206*a* or all idle or inactive communications devices 208,210 that are camping on the service area 206*a*.

As a fourth example, the network node 206 may indicate the number of uplink grants per RAPID in a MAC sub-header, transmitted to the communications device 208. In some embodiments, an additional filed is added to an existing MAC sub-header to indicate the number of uplink grants per RAPID in the RAR message. Any existing Reserved (R) or unused fields in any MAC sub-header may be used, e.g. reused, to indicate the number of uplink grants. Such an Reserved or unused filed is sometimes in this disclosure referred to as an R field. In some examples, one R field may be sufficient. R field with value 0 may indicate that there is a single grant carried per RAPID, otherwise, there are two grants per RAPID. Several R fields may be combined together to carry the exact value of the number of UL grants per RAPID.

In some embodiments, some bits of RAPID may be borrowed to carry and/or indicate the number of grants per RAPID, if there are quite few preambles assigned to a specific preamble group.

In some other embodiments, the communications device 208 may signal its preference on number of grants per RAPID to the network, e.g. to the network node 206. Upon reception of the signalling, the network node 206 may acknowledge the communications device's 208 choice, or reject its choice and at the same time, the network node 206 may assign the communications device 208 with a different choice on the number of uplink grants per RAPID.

As a fifth example, the network node 206 may indicate the number of uplink grants per RAPID in Downlink Control Information (DCI) transmitted to the communications device 208. The DCI indicates the resource assignment in uplink or downlink for one Radio Network Temporary Identifier (RNTI).

Actions 305

The network node 206 transmits the determined number of uplink grants to the communications device 208.

The network node 206 may transmit the determined number of uplink grants to the communications device 208 in several ways.

As a first example, the network node 206 may transmit, to the communications device 208, a single RA response message comprising the determined number of uplink grants.

As a second example, the network node 206 may transmit, to the communications device 208, a plurality of RA response messages for the RAPID. Each RA response message comprises an uplink grant for the RAPID and the plurality of RA response messages are equal in number to the determined number of uplink grants.

In some embodiments, the network node 206 transmits the plurality of RA responses at different time instances within one RA response time window. Thus, several RA responses for the same RAPID may be sent at different time instances within the RA response window.

Alternatively, in some embodiments, the network node 206 transmits the plurality of RA responses multiplexed in one Medium Access Control Physical Data Unit (MAC PDU). Thereby each one of the plurality of RA responses is transmitted in a respective MAC sub-header. Thus, several RARs may be multiplexed in one MAC PDU. For example, there may be a first MAC sub-header comprising the RAPID and a first RA response with an uplink grant and then a second, i.e. new (identical), MAC sub-header comprising the same RAPID and a second, i.e. new, RA response with a different uplink grant.

Figure 4:
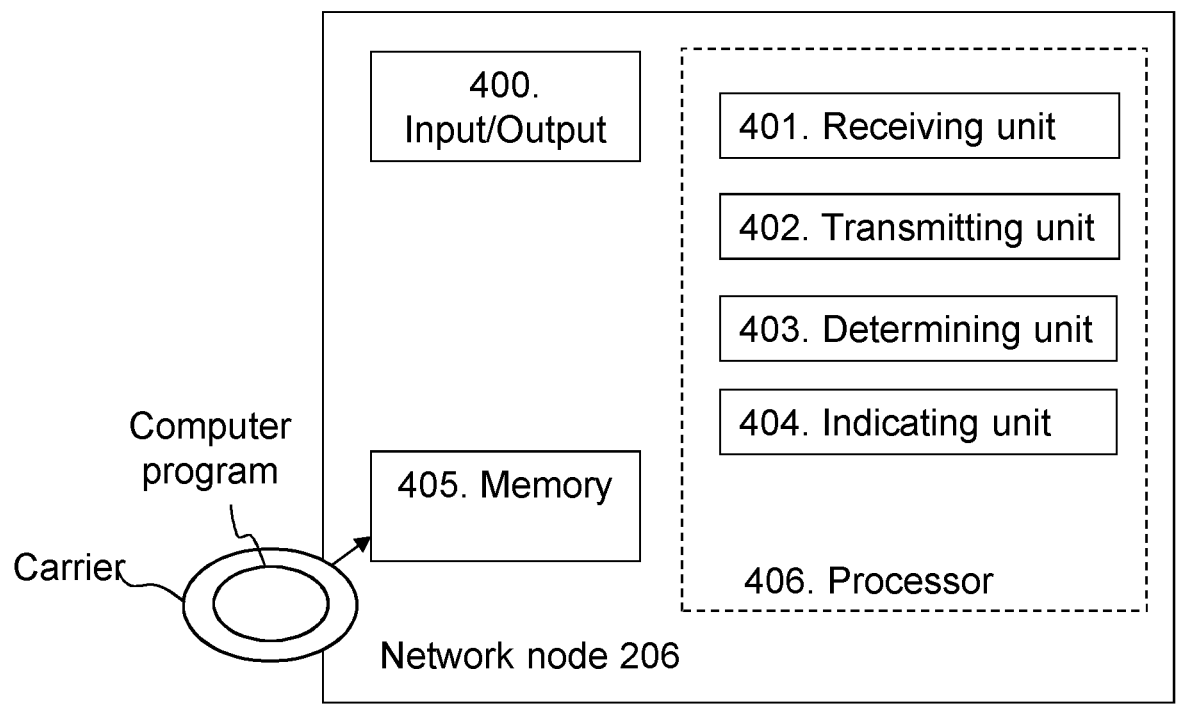
FIG. 4 is a schematic block diagram illustrating embodiments of a network node.

To perform the method for transmitting uplink grants to the communications device 208, the network node 206 may be configured according to an arrangement depicted in FIG. 4. As previously mentioned, the communications device 208 is configured to operate in the service area 206*a* served by the network node 206.

In some embodiments, the network node 206 comprises an input and/or output interface 400 configured to communicate with one or more communications devices 208,210, e.g. with the first communications device 208 and/or with the second communications device 210, and/or with one or more other network nodes, e.g. gNBs, and/or one or more core network nodes, e.g. first core network node 204. The input and/or output interface 400 may comprise a wireless receiver (not shown) and a wireless transmitter (not shown).

The network node 206 is configured to receive, by means of a receiving unit 401 configured to receive, a transmission, e.g. a data packet, a signal or information, from one or more communications devices 208,210, e.g. from the first communications device 208 and/or from the second communications device 210, and/or from one or more other network nodes, e.g. gNBs, and/or one or more core network nodes, e.g. first core network node 204. The receiving unit 401 may be implemented by or arranged in communication with a processor 406 of the network node 206. The processor 406 will be described in more detail below.

In some embodiments, the network node 206 is configured to receive the load measure on the PRACH from the communications device 208 or from another communications device 210 operating in the service area 206*a*.

The network node 206 is configured to transmit, by means of a transmitting unit 402 configured to transmit, a transmission, e.g. a data packet, a signal or information, to one or more communications devices 208,210, e.g. to the first communications device 208 and possibly also to the second communications device 210, and/or to one or more other network nodes, e.g. gNBs, and/or one or more core network nodes, e.g. first core network node 204. The transmitting unit 402 may be implemented by or arranged in communication with the processor 406 of the network node 206.

The network node 206 is configured to transmit a determined number of uplink grants to the communications device 208.

The network node 206 may be configured to transmit the determined number of uplink grants to the communications device 208 in several ways by e.g. transmitting an indication indicating the number of uplink grants.

As a first example, the network node 206 may be configured to transmit, to the communications device 208, a single RA response message comprising the determined number of uplink grants.

As a second example, the network node 206 may be configured to transmit, to the communications device 208, a plurality of RA response messages for the RAPID. Each RA response message comprises an uplink grant for the RAPID and the plurality of RA response messages are equal in number to the determined number of uplink grants.

In some embodiments, the network node 206 is configured to transmit the plurality of RA responses at different time instances within one RA response time window. Thus, several RA responses for the same RAPID may be sent at different time instances within the RA response window.

Alternatively, in some embodiments, the network node 206 is configured to transmit the plurality of RA responses multiplexed in one MAC PDU. Thereby each one of the plurality of RA responses is transmitted in a respective MAC sub-header.

The network node 206 may be configured to determine, by means of a determining unit 403 configured to determine, a number of uplink grants to be associated with a RAPID of a PRACH preamble transmission. The determining unit 403 may be implemented by or arranged in communication with the processor 406 of the network node 206.

The network node 206 is configured to determine, based on a load measure on the PRACH between the network node 206 and the communications device 208 in relation to a load threshold, a number of uplink grants that are to be associated with a RAPID of a PRACH preamble transmission received from the communications device 208.

In some embodiments, the network node 206 is configured to determine the number of uplink grants per RAPID to be two or more when the load measure is above the load threshold and to be one when the load measure is equal to or below the load threshold.

The network node 206 may be configured to determine the load measure in different ways which will be described below.

As a first example, the network node 206 may be configured to determine a number of available PRACH occasions that are used for PRACH preamble transmissions to the network node 206, and then the network node 206 may be configured to determine the load measure based on a number of received PRACH preamble transmissions in relation to the number of available PRACH occasions.

As a second example, the network node 206 may be configured to determine a received power of a PRACH preamble transmission and to determine the load measure as a function of the measured received power.

As a third example, the network node 206 may be configured to determine a number of RAs, determine a service causing the RAs, and to determine, e.g. based on the determined service, the load measure as a predetermined percentage of the determined number of RAs.

As a fourth example, the network node 206 may be configured to determine a geographical distribution of communications devices 208,210 operating within the service area 206*a* and of different types of services provided in the service area 206*a* served by the network node 206 and to determine the load measure as a function of the determined geographical distribution of the communications devices 208,210 and of the different types of services.

As a fifth example, the network node 206 may be configured to determine a number of RAs as a function of a time of day and determining the load measure based on the determined number of RAs and on the time of the day.

As a sixth example, the network node 206 may be configured to measure received uplink radio channel quality for transmissions received on the PRACH, on a PUSCH or on a PUCCH, and determine the load measure based on the measured received uplink radio channel quality. As previously described, the network node 206 may be configured to determine the load measure on the PRACH based on measurements performed on the PUSCH or the PUCCH. For example, if the channel quality on the PUSCH or the PUCCH is determined to be poor, there is a high load in the service area 206*a* and thus it is assumed that the load on the PRACH is high as well. Thus, the load measure on the PRACH may be determined based on measured received uplink radio channel quality on the PUSCH or the PUCCH.

In some embodiments, the network node 206 is configured to determine the load measure on the PRACH.

The network node 206 may be configured to indicate, by means of an indicating unit 404 configured to indicate, the determined number to the communications device 208. The indicating unit 404 may be implemented by or arranged in communication with the processor 406 of the network node 206.

The network node 206 may be configured to indicate the number of uplink grants per RAPID in several ways.

As a first example, the network node 206 may be configured to indicate the number of uplink grants per RAPID in a RRC message transmitted to the communications device 208. Thus, the network node 206 may be configured to indicate the number of uplink grants per RAPID using dedicated RRC signalling. The RRC message may be a RRC connection reconfiguration message. Further, the communications device 208 may be in connected inactive mode or in connected active mode.

As a second example, the network node 206 may be configured to indicate the number of uplink grants per RAPID in a MAC CE transmitted to the communications device 208. Thus, the network node 206 may be configured to indicate the number of uplink grants per RAPID using Layer 1/Layer 2 signalling.

As a third example, the network node 206 may be configured to indicate the number of uplink grants per RAPID in a SIB. Thus, the network node 206 may be configured to broadcast the indication of the number of uplink grants per RAPID.

As a fourth example, the network node 206 may be configured to indicate the number of uplink grants per RAPID in a MAC sub-header, transmitted to the communications device 208.

As a fifth example, the network node 206 may be configured to indicate the number of uplink grants per RAPID in DCI transmitted to the communications device 208.

In some embodiments, the network node 206 is configured to perform, by means of one or more other units configured to perform one or more further actions described herein. The one or more other units may be implemented by or arranged in communication with the processor 406 of the network node 206.

The network node 206 may also comprise means for storing data. In some embodiments, the network node 206 comprises a memory 405 configured to store the data. The data may be processed or non-processed data and/or information relating thereto. The memory 405 may comprise one or more memory units. Further, the memory 405 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the network node 206.

Embodiments herein for transmitting uplink grants to the communications device 208 may be implemented through one or more processors, such as the processor 406 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the network node 206. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the network node 206.

Those skilled in the art will also appreciate that the input/output interface 400, the receiving unit 401, the transmitting unit 402, the determining unit 403, indicating unit 404, and the one or more other units above may refer to a combination of analogue and digital circuits, and/or one or more processors configured with software and/or firmware, e.g. stored in the memory 405, that when executed by the one or more processors such as the processors in the network node 206 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 5:
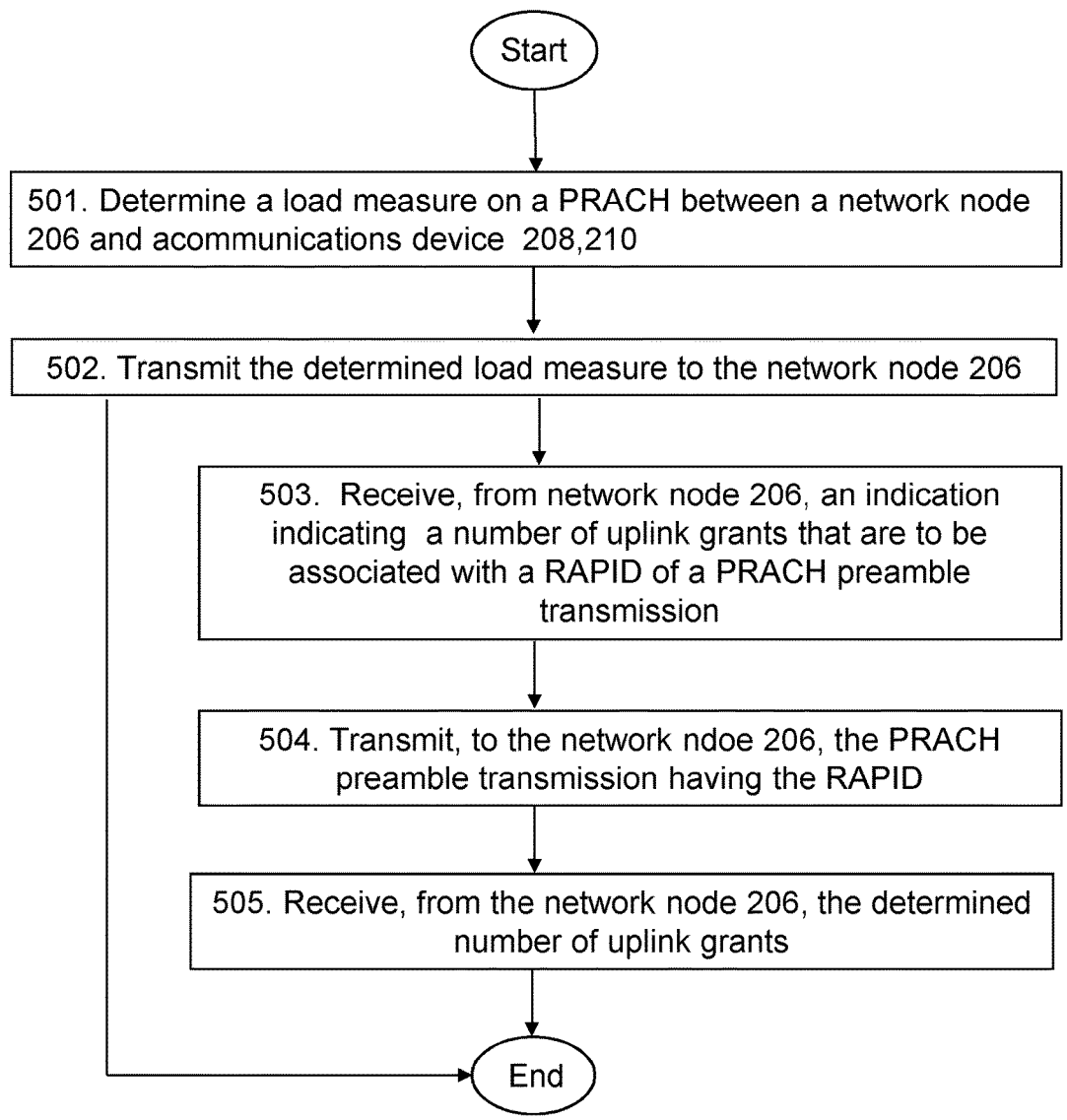
FIG. 5 is a flowchart depicting embodiments of a method performed by a communications device.

An example of a method performed by the communications device 208, 210 for assisting the network node 206 in transmitting uplink grants to the communications device 208 will now be described with reference to a flowchart depicted in FIG. 5. As previously mentioned, the communications device 208,210 operates in the service area 206a served by the network node 206.

The methods comprise one or more of the following actions. Thus, one or more of the following actions may be optional. Further, it should be understood that the actions may be taken in any suitable order and that some actions may be combined.

Action 501

The communications device 208, 210 determines a load measure on a PRACH between the network node 206 and the communications device 208,210.

The communications device 208, 210 may determine the load measure in several ways.

As a first example, the communications device 208, 210 may determine a number of PRACH preamble transmissions needed to complete a Random Access, RA, and then determine the load measure based on the determined number of PRACH preamble transmissions. For example, if the number of PRACH preamble transmissions needed to complete the RA is lower than a lower threshold, the load measure is determined to be low, and if it is larger than an upper threshold being larger than the lower threshold, the load measure is determined to be high. In such an example, the load is medium when the number of PRACH preamble transmissions needed to complete the RA is between the lower and upper thresholds.

As a second example, the communications device 208, 210 may determine a period of time between a first PRACH preamble transmission and a first message 3 (Msg3) transmission, and then determine the load measure based on the determined period of time. For example, if the period of time between the first PRACH preamble transmission and the first message 3 transmission is lower than a lower threshold, the load measure is determined to be low, and if it is larger than an upper threshold being larger than the lower threshold, the load measure is determined to be high. In such an example, the load is medium when the time is between the lower and upper thresholds.

As a third example, the communications device 208,210 may determine a transmission power for a PRACH preamble transmission and then determine the load measure based on the determined transmission power. For example, if the transmission power is lower than a lower threshold, the load measure is determined to be low, and if it is larger than an upper threshold, the load measure is determined to be high. In such an example, the load is medium when the power is between the lower and upper thresholds.

The PRACH load may be measured per Random Access preamble group or PRACH resource group. In for example a NR communications network, the Random Access preambles, e.g. the PRACH preambles, or the PRACH resources may be split into many different groups, and each of them may serve different purpose. In one example, the PRACH preambles or PRACH resources are defined per SSB or SSB group. In another example, the PRACH preambles or PRACH resources are split groups depending on the data volume that is available for transmissions. For each split, the PRACH load may be measured separately.

The PRACH load may be measured per service provided, per Logical CHannel (LCH), or per LCH group.

Action 502

The communications device 208,210 transmits the determined load measure to the network node 206. In other words, the communications device 208,210 may transmit information about the determined load measure to the network node 206. Thereby, the network node 206 will receive knowledge about the load on the PRACH.

Thus, the RACH load may be measured by the communications device 208,210, and reported to the network node 206 via signalling. The communications device 208,210 may signal, to the network node 206, information about the number of PRACH preamble transmissions for a PRACH access request to become successful, information about a delay for a PRACH access request to complete the procedure, or information about the transmission power for the PRACH preamble transmissions. Other metrics may be measured by the communications device 208,210 to determine the PRACH load. The load information may be signalled to the network node 208 via RRC signalling or by transmission of a MAC CE, or other L1/L2 signalling, such as the information may be carried via PUCCH channel.

Action 503

In some embodiments, the communications device 208 receives, from the network node 206, an indication indicating a number of uplink grants that are to be associated with a RAPID of a PRACH preamble transmission transmitted from the communications device 208. Thereby, the communications device 208 will know how many uplink grants the network node 206 will transmit in response to a PRACH preamble transmission from the communications device 208.

As previously described, the indication may be transmitted from the network node 206 in several ways. Consequently, the communications device 208 may receive the indication in several ways.

As a first example, the communications device 208 may receive from the network node 206 a RRC message indicating the number of uplink grants per RAPID. Thus, dedicated RRC signalling may be used to indicate the number of uplink grants per RAPID.

As a second example, the communications device 208 may receive from the network node 206 a MAC CE indicating the number of uplink grants per RAPID. Thus, Layer 1/Layer 2 signalling may be used to indicate the number of uplink grants per RAPID.

As a third example, the communications device 208 may receive from the network node 206 a SIB indicating the number of uplink grants per RAPID. Thus, broadcast may be used to indicate the number of uplink grants per RAPID.

As a fourth example, the communications device 208 may receive from the network node 206 a MAC sub-header indicating the number of uplink grants per RAPID.

As a fifth example, the communications device 208 may receive from the network node 206 DCI indicating the number of uplink grants per RAPID.

It should be understood that the communications device 208 has to be informed about the number of uplink grants per RAPID in order to interpret a received RAR, e.g. a RAR format, correctly. For example, if the communications device 208 is not informed about the RAR format, e.g. about how many uplink grants the RAR is to comprise, the communications device 208 may misinterpret a field of a second UL grant as a Temporary C-RNTI field when the communications device 208 follows a RAR format comprising only a single uplink grant to interpret a received RAR comprising two uplink grants for a RAPID.

Further, it should be understood that in some embodiments, the communications device 208 may signal its preference on number of uplink grants per RAPID to the network, e.g. to the network node 206. Upon reception of the signalling, the network node 206 may acknowledge the communications device's 208 choice, or reject its choice and at the same time, the network node 206 may assign the communications device 208 with a different choice on the number of uplink grants per RAPID. In such embodiments, the communications device 208 may receive an acknowledgement from the network node 206 or an indication about a different number of uplink grant than the number of uplink grants preferred by the communications device 206.

Action 504

In some embodiments, the communications device 208 transmits, to the network node 206, the PRACH preamble transmission having the RAPID. This is done in order to perform a random access procedure to get access to the communications network.

Action 505

In some embodiments, the communications device 208 receives, from the network node 206, one or more of the determined number of uplink grants. The communications device 208 may receive the one or more determined number of uplink grants from the network node 206 in response to the transmitted PRACH preamble transmission.

Figure 6:
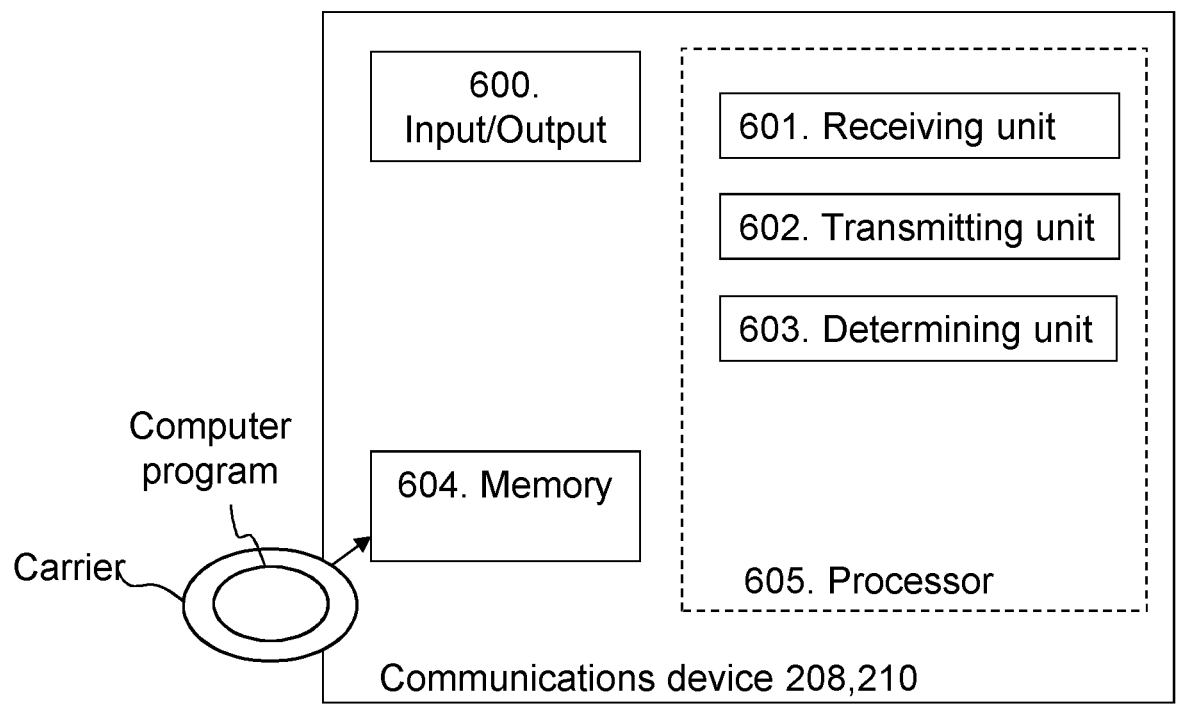
FIG. 6 is a schematic block diagram illustrating embodiments of a communications device.

To perform the method for assisting the network node 206 in transmitting uplink grants to the communications device 208, the communications device 208,210 may be configured according to an arrangement depicted in FIG. 6. As previously mentioned, the communications device 208,210 is configured to operate in the service area 206a served by the network node 206.

In some embodiments, the communications device 208,210 comprises an input and/or output interface 600 configured to communicate with one or more network nodes, e.g. the network node 206, one or more second network nodes, and/or one or more core network nodes, e.g. the first core network node 204, and/or one or more other communications devices 208,210. The input and/or output interface 600 may comprise a wireless receiver (not shown) and a wireless transmitter (not shown).

The communications device 208,210 is configured to receive, by means of a receiving unit 601 configured to receive, a transmission, e.g. a data packet, a signal or information, from one or more network nodes, e.g. the network node 206, one or more second network nodes, and/or one or more core network nodes, e.g. the first core network node 204, and/or one or more other communications devices 208,210. The receiving unit 601 may be implemented by or arranged in communication with a processor 605 of the communications device 208,210. The processor 605 will be described in more detail below.

In some embodiments, the communications device 208 is configured to receive, from the network node 206, an indication indicating a number of uplink grants that are to be associated with a RAPID of a PRACH preamble transmission transmitted from the communications device 208,210.

As previously described, the indication may be transmitted from the network node 206 in several ways. Consequently, the communications device 208 may be configured to receive the indication in several ways.

As a first example, the communications device 208 may be configured to receive from the network node 206 a RRC message indicating the number of uplink grants per RAPID. Thus, dedicated RRC signalling may be used to indicate the number of uplink grants per RAPID.

As a second example, the communications device 208 may be configured to receive from the network node 206 a MAC CE indicating the number of uplink grants per RAPID. Thus, Layer 1/Layer 2 signalling may be used to indicate the number of uplink grants per RAPID.

As a third example, the communications device 208 may be configured to receive from the network node 206 a SIB indicating the number of uplink grants per RAPID. Thus, broadcast may be used to indicate the number of uplink grants per RAPID.

As a fourth example, the communications device 208 may be configured to receive from the network node 206 a MAC sub-header indicating the number of uplink grants per RAPID.

As a fifth example, the communications device 208 may receive from the network node 206 DCI indicating the number of uplink grants per RAPID In some embodiments, the communications device 208 is configured to receive, from the network node 206, one or more of the determined number of uplink grants.

The communications device 208,210 is configured to transmit, by means of a transmitting unit 602 configured to transmit, a transmission, e.g. a data packet, a signal or information, to one or more network nodes, e.g. the network node 206, one or more second network nodes, and/or one or more core network nodes, e.g. the first core network node 204, and/or one or more other communications devices 208,210. The transmitting unit 602 may be implemented by or arranged in communication with the processor 605 of the communications device 208,210.

The communications device 208,210 is configured to transmit the determined load measure to the network node 206.

In some embodiments, the communications device 208 is configured to transmit, to the network node 206, the PRACH preamble transmission having the RAPID.

The communications device 208,210 may be configured to determine, by means of a determining unit 603 configured to determine, a load measure on a PRACH between the network node 206 and the communications device 208,210. The determining unit 603 may be implemented by or arranged in communication with the processor 605 of the communications device 208,210.

The communications device 208,210 may be configured to determine the load measure in several ways.

As a first example, the communications device 208,210 may be configured to determine a number of PRACH preamble transmissions needed to complete a RA, and then determine the load measure based on the determined number of PRACH preamble transmissions.

As a second example, the communications device 208, 210 may be configured to determine a period of time between a first PRACH preamble transmission and a first message 3 (Msg3) transmission, and then be configured to determine the load measure based on the determined period of time.

As a third example, the communications device 208,210 may be configured to determine a transmission power for a PRACH preamble transmission and then be configured to determine the load measure based on the determined transmission power.

In some embodiments, the communications device 208, 210 is configured to perform, by means of one or more other units configured to perform one or more further actions described herein. The one or more other units may be implemented by or arranged in communication with the processor 605 of the communications device 208,210.

The communications device 208,210 may also comprise means for storing data. In some embodiments, the communications device 208,210 comprises a memory 604 configured to store the data. The data may be processed or non-processed data and/or information relating thereto. The memory 604 may comprise one or more memory units. Further, the memory 604 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the communications device 208,210.

Embodiments herein for assisting the network node 206 in transmitting uplink grants to the communications device 208 may be implemented through one or more processors, such as the processor 605 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the network node 206. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the communications device 208,210.

Those skilled in the art will also appreciate that the input/output interface 600, the receiving unit 601, the transmitting unit 602, the determining unit 603, and the one or more other units above may refer to a combination of analogue and digital circuits, and/or one or more processors configured with software and/or firmware, e.g. stored in the memory 604, that when executed by the one or more processors such as the processors in the communications device 208,210 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Further Extensions and Variations

Figure 7:
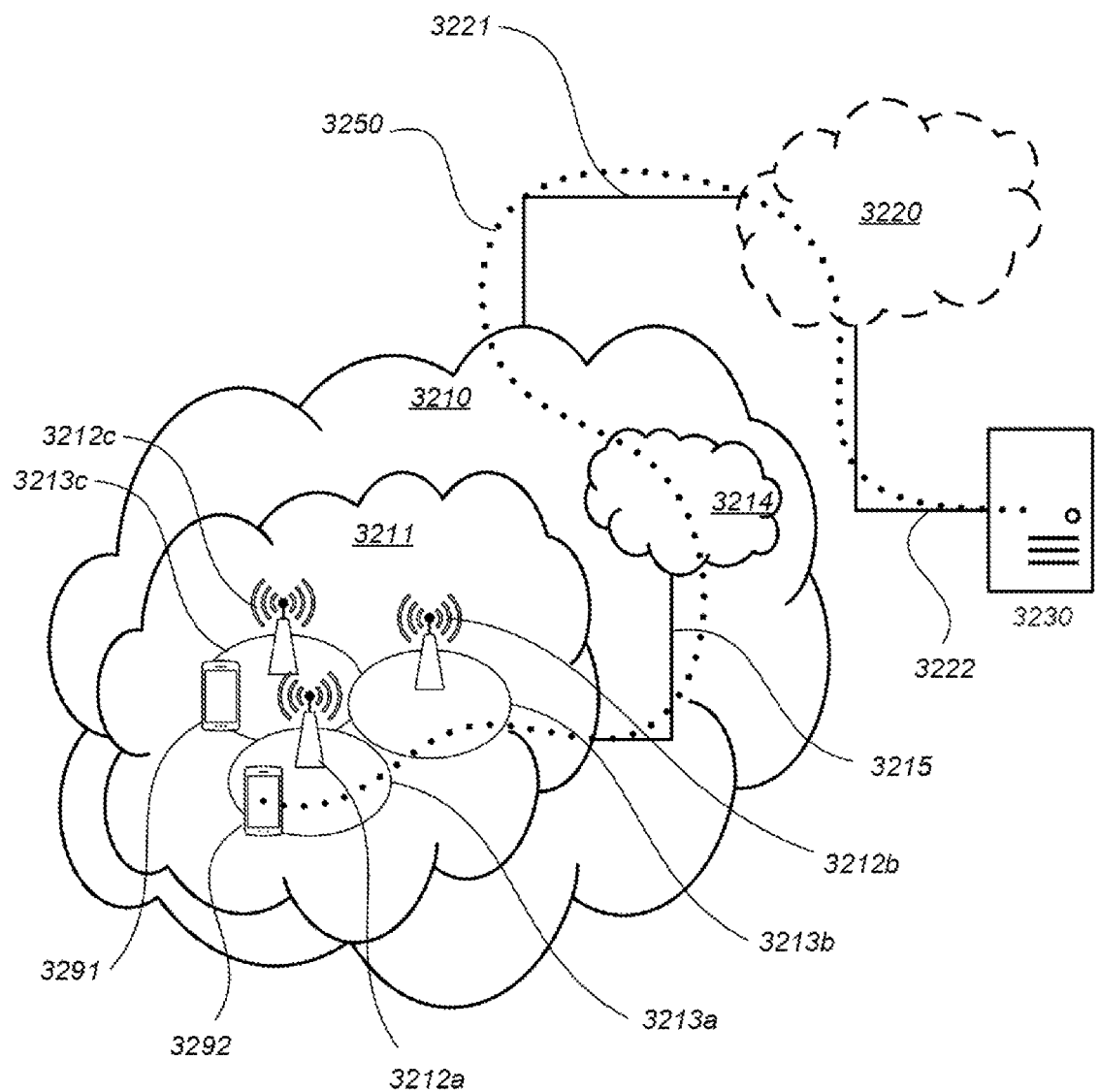
FIG. 7 schematically illustrates a telecommunication network connected via an intermediate network to a host computer.

With reference to FIG. 7, in accordance with an embodiment, a communication system includes a telecommunication network 3210 such as the wireless communications network 100, e.g. a WLAN, such as a 3GPP-type cellular network, which comprises an access network 3211, such as a radio access network, and a core network 3214. The access network 3211 comprises a plurality of base stations 3212a, 3212b, 3212c, such as the network node 110, 130, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the wireless device 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
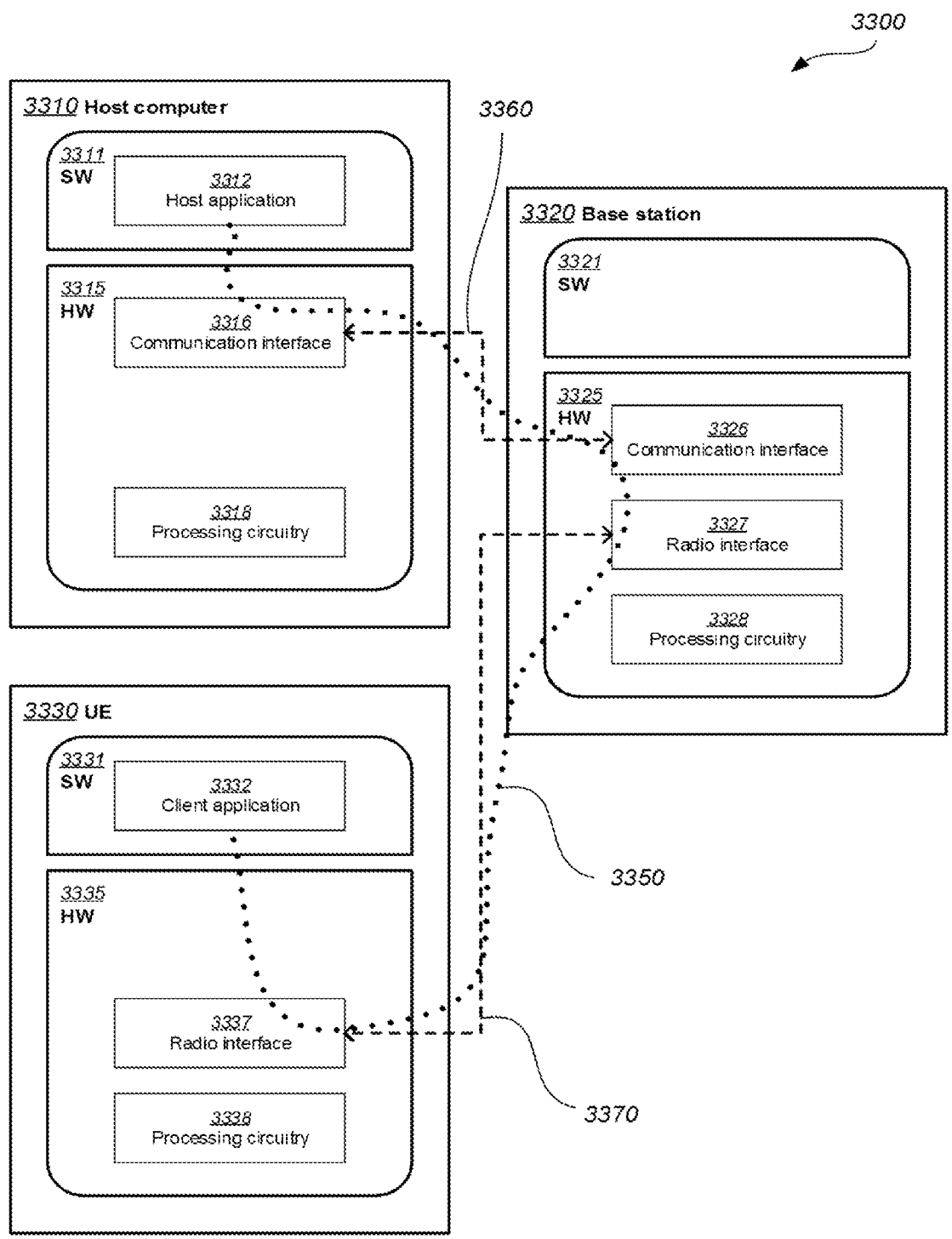
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the pSIM scheduling allowing more positioning assistance data to be broadcasted.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIGS. 18 and 19 and the corresponding text are about a downstream aspect of the radio-related invention, while FIGS. 20 and 21 and the corresponding text discuss an upstream aspect.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 9 will be included in this section.

In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 10 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 11 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 12 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a network node for transmitting uplink grants to a communications device, wherein the communications device operates in a service area served by the network node, and wherein the method comprises:
    determining a load measure on a Physical Random Access Channel (PRACH) between the network node and the communications device;
    receiving a load measure on the PRACH from the communications device or from another communications device operating in the service area;
    combine the determined load measure and the received load measure,
    wherein the determining of the load measure further comprises:
        determining a number of available PRACH occasions that are used for PRACH preamble transmissions to the network node; and
        determining the load measure based on the combination and a number of received PRACH preamble transmissions in relation to the number of available PRACH occasions;
    based on the load measure on the PRACH between the network node and the communications device in relation to a load threshold, determining a number of uplink grants that are to be associated with a Random Access Preamble Identity (RAPID) of a PRACH preamble transmission received from the communications device, wherein the determining of the number of uplink grants per RAPID comprises:
        determining the number of uplink grants per RAPID as two or more uplink grants when the load measure is above the load threshold; and
        determining the number of uplink grants per RAPID as one uplink grant when the load measure is equal to or below the load threshold;
        indicating the determined number to the communications device; and
        transmitting the determined number of uplink grants to the communications device.

2. The method of claim 1, wherein the determining of the load measure further comprises one out of:
    determining a received power of a PRACH preamble transmission and determining the load measure as a function of the received power;
    determining a number of Random Accesses (RAs), determining a service causing the RAs, and determining the load measure as a predetermined percentage of the determined number of RAs;
    determining a geographical distribution of communications devices operating within the service area and of different types of services in the service area served by the network node and determining the load measure as a function of the determined geographical distribution of the communications devices and of the different types of services;
    determining a number of RAs as a function of a time of day and determining the load measure based on the determined number of RAs and on the time of the day; and
    measuring received uplink radio channel quality for transmissions received on the PRACH, on a Physical Uplink Shared Channel (PUSCH), or on a Physical Uplink Control Channel (PUCCH), and determining the load measure based on the measured received uplink radio channel quality.

3. The method of claim 1, wherein the indicating of the number of uplink grants comprises one out of:
    indicating the number of uplink grants per RAPID in a Radio Resource Control (RRC) message transmitted to the communications device;
    indicating the number of uplink grants per RAPID in a Medium Access Control (MAC) Control Element (CE) transmitted to the communications device;
    indicating the number of uplink grants per RAPID in a System Information Block (SIB);
    indicating the number of uplink grants per RAPID in a MAC sub-header, transmitted to the communications device; and
    indicating the number of uplink grants per RAPID in Downlink Control Information (DCI) transmitted to the communications device.

4. The method of claim 1, wherein the transmitting of the number of uplink grants to the communications device comprises at least one out of:
    transmitting, to the communications device, a single RA response message comprising the determined number of uplink grants; and
    transmitting, to the communications device, a plurality of RA response messages for the RAPID, wherein each RA response message comprises an uplink grant for the RAPID and wherein the plurality of RA response messages is equal in number to the determined number of uplink grants.

5. The method of claim 4, wherein the transmitting of the plurality of RA responses comprises one out of:
    transmitting the plurality of RA responses at different time instances within one RA response time window; and
    transmitting the plurality of RA responses multiplexed in one Medium Access Control Physical Data Unit (MAC PDU), whereby each one of the plurality of RA responses is transmitted in a respective MAC sub-header.

6. A method performed by a communications device for assisting a network node in transmitting uplink grants to the communications device, wherein the communications device operates in a service area served by the network node, and wherein the method comprises:
    determining a load measure on a Physical Random Access Channel (PRACH) between the network node and the communications device, wherein the determining of the load measure on the PRACH comprises:
        determining a number of PRACH preamble transmissions needed to complete a Random Access (RA), and
        determining the load measure based on the determined number of PRACH preamble transmissions;

transmitting the determined load measure to the network node, wherein the network node determines the load measure based on combination of the transmitted load measure from the communications device and a load determined by the network node on the PRACH;

receiving, from the network node, an indication indicating a number of uplink grants that are to be associated with a Random Access Preamble Identity (RAPID) of a PRACH preamble transmission transmitted from the communications device,
wherein the number of uplink grants are determined based on the load measure on the PRACH in relation to a load threshold,
wherein the determination of the number of uplink grants that are to be associated with the RAPID is based on the combined load measure,
wherein the number of uplink grants per RAPID is two or more uplink grants when the load measure is above a load threshold, and
wherein the number of uplink grants per RAPID is one uplink grant when the load measure is equal to or below the load threshold;
transmitting, to the network node, the PRACH preamble transmission having the RAPID; and
receiving, from the network node, one or more of the determined number of uplink grants.

7. The method of claim 6, wherein the determining of the load measure on the PRACH further comprises one or more out of:
determining a period of time between a first PRACH preamble transmission and a first message 3 (Msg3) transmission, and determining the load measure based on the determined period of time; and
determining a transmission power for a PRACH preamble transmission and determining the load measure based on the determined transmission power.

8. A network node for transmitting uplink grants to a communications device, wherein the communications device is configured to operate in a service area served by the network node, and wherein the network node comprises:
a memory and a processor, the memory storing computer program code executable by the processor whereby the network node is configured to:
determine a load measure on a Physical Random Access Channel (PRACH) between the network node and the communications device;
receive a load measure on the PRACH from the communications device or from another communications device operating in the service area;
combine the determined load measure and the received load measure, wherein the network node is configured to determine the load measure by performing:
determining a number of available PRACH occasions that are used for PRACH preamble transmissions to the network node, and
determining the load measure based on the combination and a number of received PRACH preamble transmissions in relation to the number of available PRACH occasions;
determine, based on the load measure on the PRACH between the network node and the communications device in relation to a load threshold, a number of uplink grants that are to be associated with a Random Access Preamble Identity (RAPID) of a PRACH preamble transmission received from the communications device, wherein the network node is configured to determine the number of uplink grants by performing:
determining the number of uplink grants per RAPID as two or more uplink grants when the load measure is above the load threshold; and
determining the number of uplink grants per RAPID as one uplink grant when the load measure is equal to or below the load threshold;
indicate the determined number to the communications device; and
transmit the determined number of uplink grants to the communications device.

9. The network node of claim 8, the memory storing computer program code executable by the processor whereby the network node is further configured to determine the load measure by performing one out of:
determining a received power of a PRACH preamble transmission and determining the load measure as a function of the measured received power;
determining a number of Random Accesses (RAs), determining a service causing the RAs, and determining the load measure as a predetermined percentage of the determined number of RAs;
determining a geographical distribution of communications devices operating within the service area and of different types of services in the service area served by the network node and determining the load measure as a function of the determined geographical distribution of the different types of communications devices and of the different types of services;
determining a number of RAs as a function of a time of day and determining the load measure based on the determined number of RAs and on the time of the day; and
measuring received uplink radio channel quality for transmissions received on the PRACH, on a Physical Uplink Shared Channel (PUSCH), or on a Physical Uplink Control Channel (PUCCH), and determining the load measure based on the measured received uplink radio channel quality.

10. The network node of claim 8, the memory storing computer program code executable by the processor whereby the network node is configured to indicate the number of uplink grants by performing one out of:
indicating the number of uplink grants per RAPID in a Radio Resource Control (RRC) message transmitted to the communications device;
indicating the number of uplink grants per RAPID in a Medium Access Control (MAC) Control Element (CE) transmitted to the communications device;
indicating the number of uplink grants per RAPID in a System Information Block (SIB);
indicating the number of uplink grants per RAPID in a MAC sub-header, transmitted to the communications device; and
indicating the number of uplink grants per RAPID in Downlink Control Information (DCI) transmitted to the communications device.

11. The network node of claim 8, the memory storing computer program code executable by the processor whereby the network node is configured to transmit the number of uplink grants to the communications device by performing at least one out of:
transmitting, to the communications device, a single RA response message comprising the determined number of uplink grants; and
transmitting, to the communications device, a plurality of RA response messages for the RAPID, wherein each RA response message comprises an uplink grant for the RAPID and wherein the plurality of RA response messages is equal in number to the determined number of uplink grants.

12. The network node of claim 11, the memory storing computer program code executable by the processor whereby the network node is configured to transmit the plurality of RA responses by performing one out of:
- transmitting the plurality of RA responses at different time instances within one RA response time window; and
- transmitting the plurality of RA responses multiplexed in one Medium Access Control Physical Data Unit (MAC PDU), whereby each one of the plurality of RA responses is transmitted in a respective MAC sub-header.

13. A communications device for assisting a network node in transmitting uplink grants to a communications device, wherein the communications device is configured to operate in a service area served by the network node, and wherein the communications device comprises:
- a memory and a processor, the memory storing computer program code executable by the processor whereby the communications device is configured to:
  - determine a load measure on a Physical Random Access Channel (PRACH) between the network node and the communications device, the communications device is configured to determine the load measure on the PRACH by performing:
    - determining a number of PRACH preamble transmissions needed to complete a Random Access (RA), and
    - determining the load measure based on the determined number of PRACH preamble transmissions;
  - transmit the determined load measure to the network node, wherein the network node determines the load measure based on combination of the transmitted load measure from the communications device and a load determined by the network node on the PRACH;
  - receive, from the network node, an indication indicating a number of uplink grants that are to be associated with a Random Access Preamble Identity (RAPID) of a PRACH preamble transmission transmitted from the communications device,
    - wherein the number of uplink grants are determined based on the load measure on the PRACH in relation to a load threshold,
    - wherein the determination of the number of uplink grants that are to be associated with the RAPID is based on the combined load measure,
    - wherein the number of uplink grants per RAPID is two or more uplink grants when the load measure is above a load threshold, and
    - wherein the number of uplink grants per RAPID is one uplink grant when the load measure is equal to or below the load threshold;
  - transmit, to the network node, the PRACH preamble transmission having the RAPID; and
  - receive, from the network node, one or more of the determined number of uplink grants.

14. The communications device of claim 13, the memory storing computer program code executable by the processor whereby the communications device is further configured to determine the load measure on the PRACH by performing one or more out of:
- determining a period of time between a first PRACH preamble transmission and a first message 3 (Msg3) transmission, and determining the load measure based on the determined period of time; and
- determining a transmission power for a PRACH preamble transmission and
- determining the load measure based on the determined transmission power.

* * * * *